United States Patent
Schlegel et al.

(10) Patent No.: US 11,016,778 B2
(45) Date of Patent: May 25, 2021

(54) METHOD FOR VECTORIZING HEAPSORT USING HORIZONTAL AGGREGATION SIMD INSTRUCTIONS

(71) Applicant: Oracle International Corporation, Redwood Shores, CA (US)

(72) Inventors: Benjamin Schlegel, Merced, CA (US); Pit Fender, Union City, CA (US); Harshad Kasture, Sunnyvale, CA (US); Matthias Brantner, Sunnyvale, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/299,483

(22) Filed: Mar. 12, 2019

(65) Prior Publication Data
US 2020/0293332 A1 Sep. 17, 2020

(51) Int. Cl.
*G06F 9/38* (2018.01)
*G06F 15/80* (2006.01)

(52) U.S. Cl.
CPC ........ *G06F 9/3887* (2013.01); *G06F 15/8023* (2013.01)

(58) Field of Classification Search
CPC ..... G06F 7/22; G06F 9/3887; G06F 2207/222
See application file for complete search history.

(56) References Cited

U.S. PATENT DOCUMENTS

| | | | | |
|---|---|---|---|---|
| 5,287,494 A | * | 2/1994 | Garcia | G06F 7/24 340/2.81 |
| 5,850,538 A | * | 12/1998 | Steinman | G06F 30/20 703/21 |
| 6,952,696 B1 | * | 10/2005 | Nadj | G06F 7/22 |
| 8,387,057 B2 | * | 2/2013 | Wilmarth | G06F 9/526 718/102 |
| 9,275,110 B2 | | 3/2016 | Pradhan | |
| 2011/0219204 A1 | | 9/2011 | Caspole | |
| 2012/0011108 A1 | | 1/2012 | Bensberg et al. | |
| 2012/0222005 A1 | | 8/2012 | Harris | |

(Continued)

OTHER PUBLICATIONS

Furtak, Timothy & Amaral, José& Niewiadomski, Robert.Using SIMD registers and instructions to enable instruction-level parallelism in sorting algorithms. Annual ACM Symposium on Parallelism in Algorithms and Architectures. 348-357. (Year: 2007).*

(Continued)

*Primary Examiner* — William B Partridge
*Assistant Examiner* — Kasim Alli
(74) *Attorney, Agent, or Firm* — Hickman Becker Bingham Ledesma LLP

(57) ABSTRACT

Techniques are provided for vectorizing Heapsort. A K-heap is used as the underlying data structure for indexing values being sorted. The K-heap is vectorized by storing values in a contiguous memory array containing a beginning-most side and end-most side. The vectorized Heapsort utilizes horizontal aggregation SIMD instructions for comparisons, shuffling, and moving data. Thus, the number of comparisons required in order to find the maximum or minimum key value within a single node of the K-heap is reduced resulting in faster retrieval operations.

20 Claims, 9 Drawing Sheets

(56) References Cited

U.S. PATENT DOCUMENTS

| | | |
|---|---|---|
| 2015/0178375 A1 | 6/2015 | Ishizaki |
| 2015/0309846 A1* | 10/2015 | Prasad .................... G06F 9/522 345/522 |
| 2016/0275078 A1 | 9/2016 | Arraluri et al. |
| 2017/0255676 A1 | 9/2017 | Attaluri |
| 2018/0004809 A1 | 1/2018 | Ramesh et al. |
| 2020/0097288 A1 | 3/2020 | Schlegel et al. |

OTHER PUBLICATIONS

Galen C. Hunt, Maged M. Michael, Srinivasan Parthasarathy, and Michael L. Scott. An efficient algorithm for concurrent priority queue heaps. (Year: 1996).*

Tridgell, Andrew and Richard P. Brent. "A General-Purpose Parallel Sorting Algorithm." Computer Sciences Laboratory Australian National University (Year: 1993).*

Deo, N., Prasad, S. Parallel heap: An optimal parallel priority queue. (Year: 1992).*

R. Fadel, K. V. Jakobsen, J. Katajainen, and J. Teuhola. Heaps and heapsort on secondary storage. Theor. Comput. Sci. 220, 2 (Jun. 17, 1999), 345-362 (Year: 1999).*

Balkesen, U.S. Appl. No. 15/944,473, filed Apr. 3, 2018, Office Action dated Jan. 27, 2020.

Xiaochen et al, "Register Level Sort Algorithm on Multi-core Simd Processors", In Proceedings of the 3rd Workshop on Irregular Applications: Architectures and Algorithms, IA3, dated 2013, 8 pages.

Wegner et al., "The External Heapsort". IEEE Trans. Softw. Eng., dated Jul. 1989. ISSN 0098-5589, 9 pages.

Satish et al., Fast Sort on Cpus, Gpus and Intel Mic Architectures, Intel, 11 pages.

Khuong et al., Heapsort: More Comparisons, Less Memory Tra_c. dated Apr. 2014, 34 pages.

J. Chhugani et al., ". Efficient implementation of Sorting on Multi-Core Simd Cpu Architecture", Proc. VLDB Endow., 1(2):1313{1324, datged Aug. 2008. ISSN 2150-8097, 12 pages.

Harada and L. Howes. Introduction to gpu radix sort. Dated 2011, 3 pages.

H. Inoue and K. Taura. "Simd- and Cache-friendly Algorithm for Sorting an Array of Structures", Proc. VLDB Endow., dated Jul. 2015. ISSN 2150-8097, 12 pages.

Gedik et al., Cellsort: High Performance Sorting on the Cell Processor, In Proceedings of the 33rd International Conference on Very Large Data Bases, VLDB '07, VLDB Endowment, 2007, 12 pages.

Fadel et al., ". Heaps and Heapsort on Secondary Storage", Theor. Comput. Sci., 220(2):345-362, dated Jun. 1999. ISSN 0304-3975, 18 pages.

E. Knuth. The Art of Computer Programming, vol. 3: (2Nd Ed.) Sorting and Searching. AddisonWesley Longman Publishing Co., Inc., Redwood City, CA, USA, 1998. ISBN 0-201-89685-0.

Bramas. "Fast Sorting Algorithms Using AVX-512 on Intel Knights Landing" CoRR, abs/1704.08579, 2017a. URL http://arxiv.org/abs/1704.08579, dated 2017, 17 pages.

Bramas. "A Novel Hybrid Quicksort Algorithm Vectorized Using AVX-512 on Intel Skylake", International Journal of Advanced Computer Science and Applications (IJACSA), Nov. 2017, 9 pages.

Zhou et al., "Implementing Database Operations Using SIMD Instructions", Proceedings of the ACM Sigmod International Conference on Management of Data, dated Jun. 3, 2002, pp. 145-156.

Liu et al., "Ad-Heap", General Purpose Processing Using GPUS, ACM, 2 Penn Plaza 701 New Yorkm NY, USA, dated Mar. 1, 2014, pp. 54-63.

Liu et al., "ad-heap: an Efficient Heap Data Structure for Asymmetric Multicore Processors", In Proceedings of Workshop on General Purpose Processing Using GPUs, ACM, dated 2014, 10 pages.

LaMarca et al., "The Influence of Caches on the Performance of Heaps", dated Jan. 1, 1996, 26 pages.

Furtak et al., "Using SIMD Registers and Instructions to Enable Instruction-Level Parallelism in Sorting Algorithms", ACM Symposium on Parallel Algorithms and Architectures, dated 2007, 10 pages.

D.E. Knuth, "The Art of Computer Programming", vol. 3: 2nd Edition Sorting and Searching, ISBN: 0-201-03803-X, pp. 129-157 from book, dated 1973.

C. Balkesen et al.. "Main-memory hash joins on multi-core CPUs: Tuning to the underlying hardware," 2013 IEEE 29th International Conference on Data Engineering, pp. 362-373.

Begley et al. "MCJoin: A Memory-constrained Join for Column-Store Main-memory Databases", dated 2012, ACM SIGMOD International Conference on Management of Data (SIGMOD '12), pp. 121-132.

Balkesen, U.S. Appl. No. 15/852,038, filed Dec. 22, 2017, Notice of Allowance dated Nov. 5, 2019.

Knuth et al. "The Art of Computer Programming", vol. 3: (2Nd Ed.) Sorting and Searching, AddisonWesley Longman Publishing Co., Inc., Redwood City, CA, USA, dated 1998, 1061 pages.

Edelkamp, et al., "Strengthened Lazy Heaps: Sur-passing the Lower Bounds for Binary Heaps", dated 2014. 14 pages.

Chowdhury et al. "Cache-oblivious Shortest Paths in Graphs Using Buffer Heap". Dated Jun. 2004, 11 pages.

Arge et al. "The Buffer Tree: A New Technique for Optimal i/o-algorithms", In Data Structures, dated Aug. 1996, 37 pages.

Balkseen, U.S. Appl. No. 15/944,473, filed Apr. 3, 2018, Notice of Allowance dated May 27, 2020.

* cited by examiner

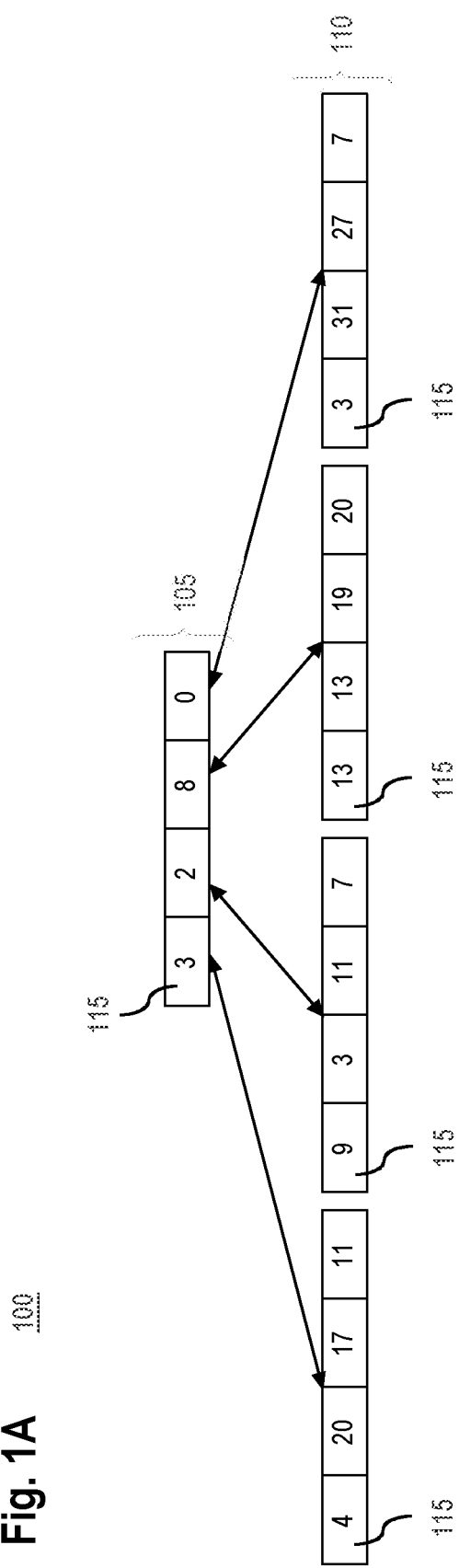
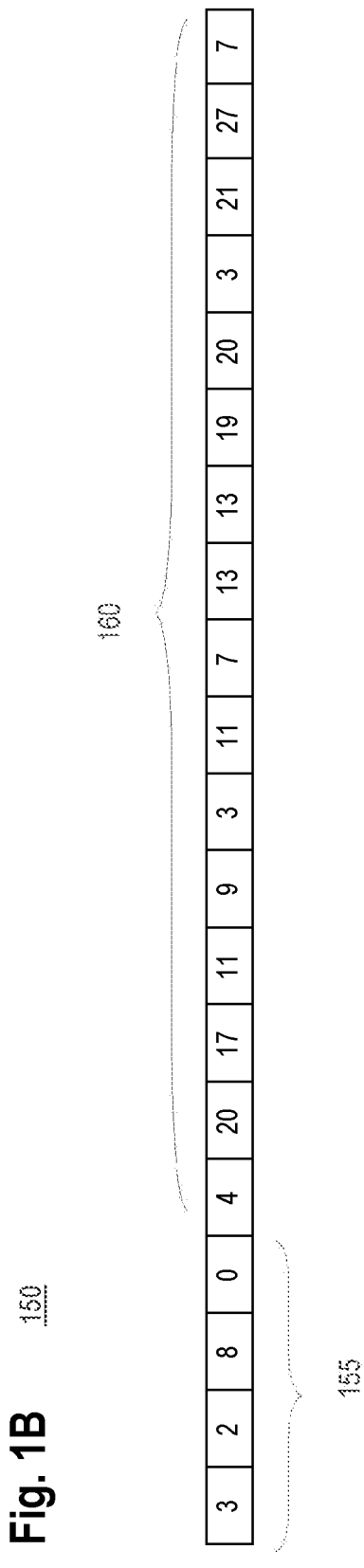
Fig. 1A
Fig. 1B

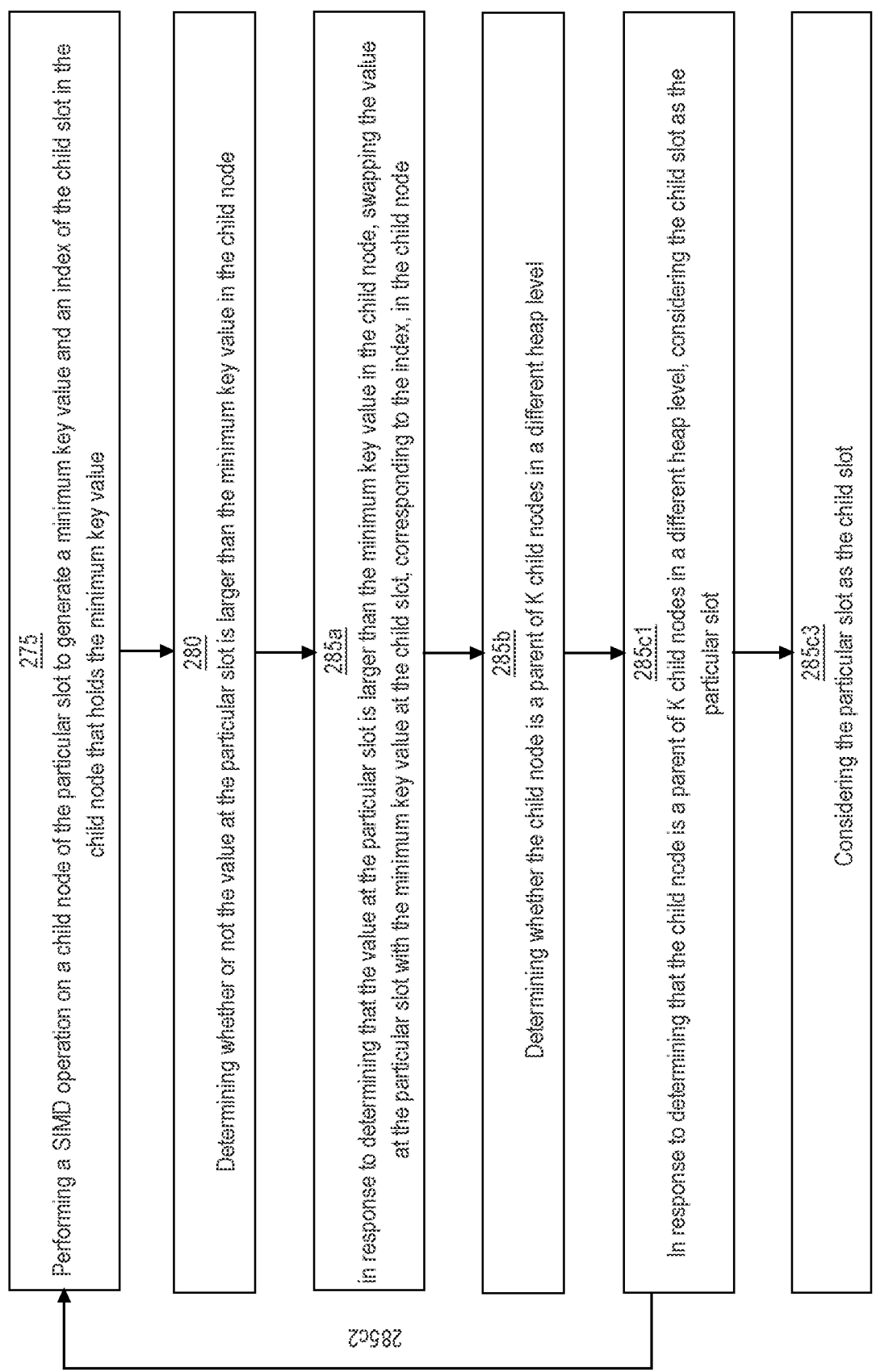

METHOD FOR VECTORIZING HEAPSORT USING HORIZONTAL AGGREGATION SIMD INSTRUCTIONS

CROSS-REFERENCE TO RELATED APPLICATIONS

This application is related to co-pending U.S. patent application Ser. No. 16/139,226, filed on Sep. 24, 2018, entitled "Method for Vectorizing D-Heaps using Horizontal Aggregation SIMD Instructions," having a common assignee and which is hereby incorporated by reference in its entirety.

FIELD OF THE INVENTION

The present disclosure relates to maintaining data structures and, more particularly, sorting of data in data structures

BACKGROUND

There exists a wide variety of sequential sorting algorithms, which can be divided into comparison-based and non-comparison-based algorithms. Comparison-based algorithms compare elements being sorted directly to obtain their order. The most efficient algorithms of this class, e.g., Quicksort, Merge Sort, and Heapsort, achieve an average time complexity of O(n log n) and are considered among the fastest sorting algorithms. Non-comparison based sort algorithms use the full or parts of the elements' respective bitstrings and lookup tables to order the elements. Algorithms in this class, e.g., Radix sort, Pigeonhole sort, Bucket sort, can achieve time complexities of O(n); however, they are not practical for many datasets.

In many applications, such as databases and search engines, sorting accounts for a large fraction of an application's overall runtime. Hence, there is a strong incentive to optimize sorting algorithms.

Discussed herein are approaches for speeding up sorting algorithms by vectorizing them and utilizing horizontal aggregation SIMD instructions for comparisons and shuffling or moving data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a diagram depicting a K-heap according to an embodiment of the present invention.

FIG. 1B illustrates a diagram depicting a linearized vectorized K-heap according to an embodiment of the present invention.

FIGS. 2A-2C illustrate a flow diagram that depicts a process for using horizontal aggregation SIMD instructions to obtain vectorized Heapsort in an embodiment of the invention.

FIGS. 2D-2E illustrate an example depicting sorting using vectorized Heapsort in an embodiment of the invention.

DETAILED DESCRIPTION

Figure 2A:
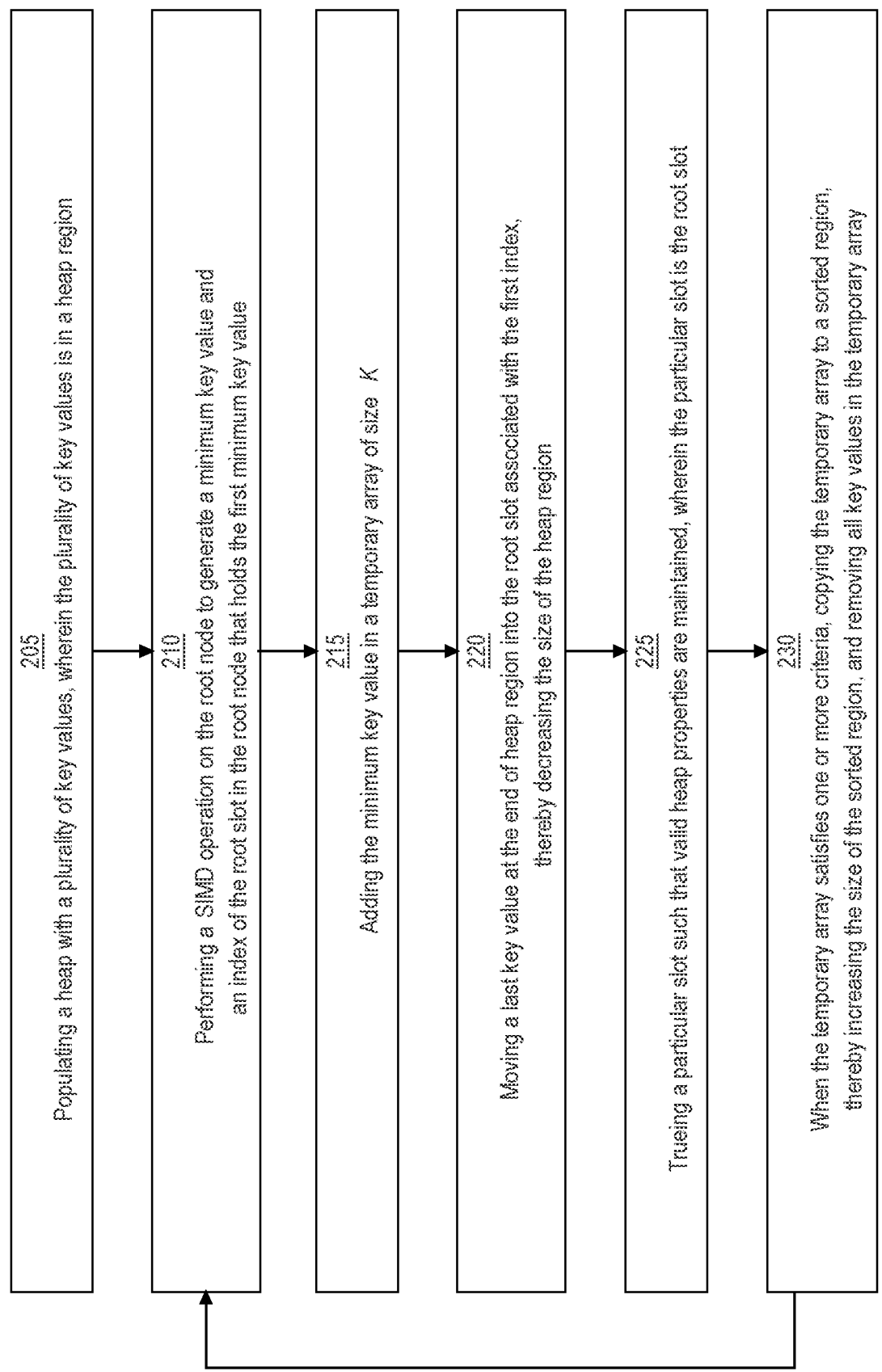

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Heapsort Overview

Heapsort is an in-place but unstable algorithm, which divides elements into a sorted and unsorted region and iteratively shrinks the unsorted region by extracting the largest element (or the smallest element when sorting descending) of the unsorted region and moving that to the sorted region. The worst-case time complexity of Heapsort is O(n log n).

Heapsort works in two phases. In the make-heap phase, the algorithm reorders the unsorted elements in a way so that they form a heap. The elements that form the heap are referred to as heap region and its respective memory as heap array. In the sorting phase, it iteratively retrieves and removes the top element of this heap and swaps it with the last element of the heap region, which is adjacent to the lower-end of the sorted region. Hence, the sorted region grows in each iteration by one while the heap region shrinks by one until all elements are in the sorted region and thus are ordered. Removing the heap's top element violates of the heap property of the heap, which is eventually restored by sifting down the previous last element of the heap region in the heap.

There are two different strategies to build the initial heap. A top-down strategy starts with an empty heap and grows the heap region, e.g., the heap, by iteratively reading one element from the unsorted region and pushing it into the heap. Building the heap is completed as soon as all elements are in the heap region. A bottom-up strategy starts by building small heaps and then merges them until the final heap is obtained; for example, it first builds heaps of size 3, then merges them to heaps of size 7, then heaps of size 15, and so on. The bottom-up strategy is usually faster than the top-down strategy because it exhibits a better cache behavior.

K-Heap Overview

A K-heap is a priority queue data structure containing an array of items that may be viewed as the nodes in a complete K-ary tree. As opposed to binary heaps, K-heaps typically run faster for heap sizes that exceed the size of the computer's cache memory because they result in less cache misses and virtual memory page faults than binary heaps.

K-heaps are implemented via any programming language that utilizes container data structures including JAVA, C++, OBJECTIVE-C or any other suitable programming environment.

As described herein, a K-heap is a priority queue data structure which contains a plurality of nodes in a tree structure wherein each node contains K values and has up to K successors/children. The plurality of nodes includes parent nodes and children nodes containing K slots, wherein each of the K slots store a key value.

In one embodiment, the K-heap is contiguously stored in a memory array having slot elements containing a beginning-most space and end-most space. Each of the plurality of nodes of the K-heap comprise K slots, K being a whole number greater than one, wherein each of the K slots store a key value, and wherein the K slots are stored contiguously within a memory address space of the memory. Each parent node has K child nodes, and each child node is a child of a respective parent slot that stores a key value that is not larger than any of the key values stored in the child node.

In one embodiment, a K-heap comprising a root level of nodes and one or more non-root level of nodes is stored in a memory array. The root node is stored in the beginning-most element of the array and the non-root levels are contiguously stored immediately after the root node in respective contiguous array elements. The K slots of the root-node are stored in the beginning-most space of the array and each K-slot of the non-root levels is stored contiguously in elements of the array immediately after K-slots of the root node are stored.

In one embodiment, a K-heap is stored in an array in a memory that comprises a plurality of heap levels, which, after the first heap level, stores contiguously with an address space of the memory for each particular heap level all child nodes of each previous heap level. Heap levels are a mechanism to organize elements of a heap and are defined by their distance from the root node. The root node forms heap level 0 where it is the only node, the children of the root node form heap level 1, and each subsequent level contains the child nodes of each respective parent node.

For the purpose of illustration, a clear example in FIG. 1A illustrates K-heap 100 containing only two (2) heap levels: a root level 105 and a non-root level 110. Other embodiments may implement any number of heap levels containing K child nodes comprising K slots in each heap level except for the first heap level containing the root node. In this example, K is four (4). The K-heap 100 includes a plurality of nodes in a tree structure including a plurality of parent nodes at root level 105 and a plurality of children nodes at root level 110. Each node contains K slots and a plurality of key values 115, where each K slot stores a key value. Parent nodes in root level 105 contain a root node and each parent node has one or more child nodes being a child of a respective parent slot. While only two levels 105, 110 are depicted in FIG. 1A, K-heap 100 may support many more non-root levels.

In one embodiment, K-heap 100 is configured to be stored in a heap array 150 of slots in a contiguous memory where each slot is an element of the heap array 150. The heap array 150 is configured to allocate additional memory for adding and storing key values, and each element of the heap array 150 may correspond to one respective slot of the nodes of K-heap 100. FIG. 1B is a diagram that depicts K-heap 150 vectorized in which key values in the K slots of the root node at the root level 105 is stored contiguously in contiguous space 155 and key values in the D slots of each node at the non-root level 110 are stored contiguously in contiguous space 160 immediately after storing the key values of the root node in contiguous space 155.

Horizontal Aggregation SIMD Instructions Overview

Single Instruction, Multiple Data (SIMD) architectures allow computers with multiple processing elements to simultaneously perform the same operation on multiple data points. SIMD architectures may perform mainly "vertical" operations where corresponding elements in separate operands are operated upon in parallel and independently.

Horizontal SIMD instructions, on the other hand, are performed across the elements of a SIMD register. Horizontal aggregation SIMD instructions possess a subclass of horizontal SIMD instructions that aggregate the values of a single vector allowing the maximum and minimum key value in a register to be located. The phminposuw instruction is one example for such instructions. It aggregates the values in a 128-bit vector using minimum as aggregation function.

SIMD instructions allow the execution alignment of the same operation on multiple data elements at once. In one embodiment, the key values stored in the K-slots of the heap are vectorized and aligned so that horizontal SIMD instructions are applied on the plurality of nodes in order to perform retrieval operations to find the minimum or maximum value within a node of the heap.

In the K-heap being contiguously stored across the array of slots of the memory, the key values stored in the K slots of the nodes are contiguously in memory and control dependencies can be minimized for the many comparisons needed for the retrieval operations on the K-heap, thus increasing the speed of the operations.

Microprocessors and computer architectures, may be configured to execute media instructions that include identifying a horizontal minimum set of digital values and its corresponding location in a register. For example, the phminposuw instruction uses an array of 16-bit magnitude comparators to aggregate values into a vector using a minimum function, and finds the value and position of the smallest vector value. The instruction further sets the bottom unsigned 16-bit value of the destination to the smallest unsigned 16-bit value in the source, and the next-from-bottom to the index of that word in the source. Such instruction was introduced as part of Intel SSE4.1 and is available in all modern x86 processors.

Although phminposuw is currently the only horizontal aggregation SIMD instruction, min-heaps and max heaps for various data types can still be obtained despite this current limitation, as further discussed herein.

An improvement caused by the approach of using horizontal aggregation SIMD instructions on K-heap retrieval operations includes less cache lines needed to be retrieved to read a single element from a K-heap, more efficient memory management strategy for growing and shrinking of vectorized K-heap, and less comparisons performed in order to find the maximum or minimum key value within a single node of a K-heap.

Vectorized Heap Implementation Overview

The following discussion describes how to use horizontal aggregation SIMD instructions to obtain vectorized Heapsort that is significantly faster compared to scalar Heapsort. The vectorized Heapsort algorithm of the present invention sorts various primitive types of data including but not limited to signed integers, unsigned integers, single-precision floating point, etc., ascending and descending. The vectorized Heapsort algorithm of the present invention works for various horizontal aggregation SIMD instructions of arbitrary SIMD vector-width K.

In an embodiment, the vectorized Heapsort has two phases, make_heap( ) and sort_heap( ), which are called inside the top-level function sort( ).

TABLE 1

Pseudo code for the vectorized sort ( ) function

```
void sort(unsigned short data[ ], int len) {
  // build the heap
  make_heap(val, len);
  // sort the heap
  sort_heap(val, len);
}
```

Table 1 illustrates pseudo code for the top-level sort( ) function of vectorized Heapsort. The sort( ) function takes two arguments data and len, which holds the values being sorted and the number of values, respectively. The make_heap( ) function builds the heap and the sort( ) function sorts the values.

The vectorized Heapsort algorithm works for any number of input values. For purposes of illustration, foregoing examples of the vectorized Heapsort algorithm will be restricted to sorting only multiples of K. However, it should be understood that any number of values can be sorted. Some values to the input data may need to be appended until a multiple of K is reached. Depending on whether the sort is descending or ascending, the smallest or largest possible value of the data type being sorted, respectively, is appended at the end of the array before running the vectorized Heapsort algorithm. After sorting, appended values are ignored. The smallest values are moved to the end of the array when sorting descending, while the largest values are moved to the end of the array when sorting ascending.

Vectorized sift_down. Sifting down an element requires at most login steps where n is the number of elements in the heap array.

TABLE 2

Pseudo code for the vectorized sift_down( ) function

```
void sift_down(unsigned short data[ ], int len, int pos) {
  int child = (pos + 1) * K;
  while (child < len) {
    __m128i in = mm_loadu_si 128((__m128i*)&data[child]);
    __m128i res = mm_minpos_epu 16(in);
    if (_mm_extract_epi 16(res, 0) < data[pos]) {
      child += _mm_extract epi 16(res, 1);
      swap(data[pos], data[child]);
      pos = child;
      child = (child + 1) * K;
    }
    else {
      break;
    }
  }
}
```

Table 2 illustrates the pseudo code for the vectorized sift_down( ) function, which takes three (3) arguments: data, pos, and len. The argument data hold the pointer to the heap array. The argument pos specifies the position of the value that might violate the heap property and should be sifted down. The argument len contains the number of elements remaining in the heap section. The sift_down( ) function starts by calculating the position of the child node in the heap array. This number depends on the vector width K, which is set to K=8 in the code snippet since the _mm_minpos_epu16 instruction is used. The function has a loop, which is used to descend down the heap until the heap property is restored. In each iteration, the minimum element of the current node is obtained using _mm_minpos_epu16.

Vectorized make_heap. The make_heap( ) function builds a K-heap for a given array of values. A K-heap can be built either in top-down or bottom-up fashion.

The vectorized top-down make_heap( ) function consists of a single loop and reuses functionality of a heap implementation, for example, a constructor and the push( ) function. The vectorized top-down make_heap( ) function works as follows: 1) it uses a special constructor of the vectorized K-heap to create an initially empty heap directly on the array that holds the data that should be sorted and 2) it runs over all values of the array and calls push( ) to insert each value into the K-heap. The array that is passed to the constructor—and is used to form the K-heap—is separated into an in each iteration growing heap region and an in each iteration shrinking unsorted region.

The special vectorized K-heap constructor has two arguments: a pre-allocated array and the array's length. It internally uses the passed array as heap array and the array's length as initial value for the reserved counter. The constructor further does not clear the values from the passed array. Otherwise, the data that should be sorted would be lost. The push( ) function takes one element of the array as input and uses the passed elements array space to increase the heap. The K-heap is built after all values of the array are processed.

TABLE 3

Pseudo code for the top-down vectorized make_heap( ) function

```
void make_heap(unsigned short data[ ], int len) {
  UB2MinHeap heap(data, len, true);
  for (int i = 0; i < len; ++i) {
    heap.push(data[i]);
  }
}
```

Table 3 illustrates the pseudo code for the top-down vectorized make_heap function that builds a K-heap. The top-down make_heap function calls the constructor of a vectorized heap that gets the input array (data) and number of values (len) passed as reserved array and length of the reserved array. The top-down make_heap function then iterates over all values of the input array and calls push( ) for each value.

Building the K-heap bottom-up is more efficient because it exhibits a better memory access pattern and thus makes better use of the cache. The algorithm starts with heaps of size K, which are by definition unsorted since all nodes of the heap contain K elements that are not ordered. Based on these size-K heaps, the algorithm merges them into heaps of size $K+K^2$, then heaps of size $K+K^2+K^3$, and so forth until the full K-heap is built. Merging the smaller K-heaps into larger K-heaps is achieved by iterating backwards over the heap-array and sifting down the elements one after another. The algorithm start iterating from the position (len-1)/K because all elements beyond this position are in the lowest level of the heap and thus cannot be sifted further down. Note that the algorithm has two loops: one iterating backwards over the heap array and one for sifting down elements. The vectorized bottom-up algorithm has still the complexity O(n log n) but with a much better constant compared the binary bottom-up algorithm of the scalar Heapsort algorithm.

TABLE 4

Pseudo code for the bottom-up vectorized make_heap( ) function

```
void make_heap(unsigned short data[ ], int len) {
    for (int i = (len − 1) / K; i >= 0; --i) {
        sift_down(data, len, i);
    }
}
```

Table 4 illustrates the pseudo code for the vectorized make_heap( ) function that works bottom-up. Starting with i=(len-1)/K, the function iterates over the heap array backwards and calls the vectorized function sift_down( ) for each of the elements.

Vectorized sort_heap. The sort_heap( ) function fetches the top element of the heap and replaces it with the last element in the heap array. K elements fetched from the K-heap are stored in a temporary vector. After fetching K elements, the content of the temporary vector is written back to the end of the heap region and thus extend the sorted region by K values.

TABLE 5

Pseudo code for the vectorized sort_heap( ) function

```
void sort_heap(unsigned short data[ ], int len) {
    int n_vec = len / K;
    for (int i = n_vec − 1; i >= 0; i--) {
        __m128i out;
        for (int j = K − 1; j >= 0; j--) {
            // get the smallest item
            __m128i in = _mm_loadu_si 128((__m128i*)data);
            __m128i res = _mm_minpos_epu 16(in);
            // buffer the item
            out = _mm_alignr_epi8(res, out, 2);
            // swap with last item of heap
            int pos = ((unsigned short*)&res)[1];
            data[pos] = data[i * K + j];
            data[i * K + j] = 0xFFFF;
            // restore the heap property
            sift_down(data, i * K + j, pos);
        }
        // reverse the order of the items in the buffer
        out = _mm_shuffle_epi8(out, rmask);
        // write back the sorted items
        write_back((__m128i*)data + i, out);
    }
}
```

Table 5 illustrates the pseudo code for the vectorized sort_heap( ) function. It has two loops: the outer loop iterates over all vectors n_vec of the input array while the inner loop always fetches K values that are written back to the sorted region in each iteration of the outer loop. Hence, the sorted region grows in each iteration of the outer loop by K values. The inner loop obtains the top element from the root node of the K-heap by calling a horizontal aggregation SIMD instruction. This value is added to the temporary vector out. The top value is replaced with the last value of the heap region, and the size of the heap is decreased by one. Since the heap property is violated, the sift_down( ) function is called to restore it. In the outer loop, the values in the out vector are shuffled before writing them back. Before shuffling, the values are stored in the wrong order in out because of the _mm_alignr epi8( ) instruction, which is used to buffer the top value into this vector. Lastly, the write_back( ) function is called to write back the values at the beginning of the sorted region.

TABLE 6

Pseudo code for the vectorized write_back( ) function

```
void write_back(__128i* ptr,128i out) {
    _mm_store_si 128(ptr, out);
}
```

Table 6 illustrates the pseudo code for the vectorized write_back( ) function. This function simply writes a vector back to memory by calling _mm_store_si128( ). Using a separate write-back function allows for efficient conversion of the values during sorting.

Payload Implementation

According to an embodiment, a heap is stored in conjunction with a payload array. The payload array is aligned with the array of the heap ("heap array"). That is, the first slot of payload array stores a payload for the first slot in the heap array, the second slot of the payload array stores a payload for the second slot in the heap array, and so forth. According to an embodiment, a slot in a payload array stores a pointer to a memory address storing payload data. Take as an example, a heap array with four values (3; 2; 4; 1) and a respective payload array with strings ('a,' 'b,' 'c,' 'd'). The heap array may be sorted via a number of permutations (for example, move value 1 to the first position, move value 3 to the third position, etc.). The same permutations are applied to the payload array. When sorted ascending, the resulting keys array is (1; 2; 3; 4) and the payload array is ('d,' 'b,' 'a,' 'c').

The payload array is maintained so that alignment between the payload array and heap array are maintained. Thus, when a key value is swapped between a parent slot and child slot in a child node of the parent slot, in the payload array, the respective slot of the parent slot is swapped with the respective slot in the child slot. Hence, whenever two values are swapped, for example, in the sift_down( ) function and sort_heap( ) function, the respective two values in the payload array are swapped. The payload array can have any data type. In an embodiment, swapping typically involves memcpy( ) calls for complex data types (e.g., strings, custom classes).

Limited Hardware Support

A CPU may only have few horizontal aggregation SIMD instructions so that data cannot be natively sorted in any order or for any data type. As long as certain data type widths are supported, however, the data being sorted can be converted before sorting to still benefit from vectorized sorting. In an embodiment, this process converts data in a certain representation before sorting, sorts the data, and converts it back after sorting. This process can mimic signed instructions with unsigned instruction and vice versa, as well as can mimic horizontal aggregation minimum SIMD instructions with horizontal aggregation maximum SIMD instructions and vice versa.

The foregoing discussion showed how to sort values in descending order using a horizontal minimum SIMD instruction. However, if values are to be sorted in ascending order, then two options are available: 1) use the inverse instruction of a horizontal minimum SIMD instruction, which is a horizontal maximum SIMD instruction, or 2) invert the values itself before sorting and after sorting. Inverting the values reverses the order of the values. For example, the inverting the unsigned 8-bit values 0, 1, 2, 3, 4 leads to 65535, 65534, 65533, 65532, 65531. The minimum of the inverted values is thus the maximum of the original non-inverted values. As such, if no horizontal maximum SIMD instruction is available, then the input values can be inverted before sorting and after sorting. The same technique can be used to sort descending if a horizontal maximum SIMD instruction available but not a horizontal minimum SIMD instruction.

In addition, the same technique can be used when a horizontal aggregation SIMD instruction that works with unsigned data types but not with signed data types and vice versa. The only difference is that the values are not inverted but, instead, the most-significant bit is flipped.

Both techniques can also be combined to sort signed data descending with only an unsigned horizontal maximum SIMD instruction available. In this case, the most-significant bit is flipped, and all values being sorted are inverted.

TABLE 7

Conversion of data before and after sorting for available instructions

|  | unsigned | | signed | |
| --- | --- | --- | --- | --- |
|  | descending | ascending | descending | ascending |
| unsigned min | native | ~x | flipmsb(x) | flipmsb(~x) |
| unsigned max | ~x | native | flipmsb(~x) | flipmsb(x) |
| signed min | flipmsb(x) | flipmsb(~x) | native | ~x |
| signed max | flipmsb(~x) | flipmsb(x) | ~x | native |

Table 7 shows the needed conversion operation that need to be executed before and after sorting. If the instruction fits the data type and operation (i.e., it can be used natively), then no conversion is needed. For example, if a signed minimum horizontal aggregation SIMD instruction is available and signed integer values should be sorted descending, then no conversion is necessary. In all other cases, the values being sorted need to be negated or bitwise inversed or both. For example, sorting signed integers ascending with only an unsigned minimum horizontal aggregation SIMD instruction (e.g., the phminposuw instruction), requires both to invert (~) and flip the sign bit (flipmsb( )) of all values before and after sorting (see top right cell in Table 7).

The conversion of the values before sorting and back-conversion after sorting can either be done as two separate runs over the data or directly while sorting. Even though a separate conversion run is cheap because it is branchless and SIMD instructions can be used for it, conversion does incur almost no costs when done while sorting. Therefore, the conversion is integrated directly into the sort algorithm by overwriting the previously explained load( ) function and write_back( ) function. The conversion in these functions is performed only once on each data element, i.e., each data element is converted only once during loading before sorting and back-converted only once after sorting. Performing the initial conversion happens within the make_heap( ) function—and thus before sorting—and differs for the two heap building strategies. For the top-down strategy, a scalar convert function is called on the data element being inserted into the heap in each iteration (see Table 3). Hence, instead of calling heap.push(data[i]), heap.push(convert(data[i])) is called, where the scalar convert( ) function does the needed conversion (i.e., inverting all bits, flipping the most-significant bit, or both). For the bottom-up strategy, the conversion needs to be performed at two places at the array simultaneously. Recall that inside the bottom-up make_heap( ) function (see Table 4), the sift_down( ) function (see Table 2) is called while iterating backwards over the array being sorted. The sift_down( ) function loads one value from the first K-th part of the array and K values from the back of the array. In each iteration, it loads another value before the single value just being loaded and another K values before the K values loaded in the last iteration. After a number of iterations, it will load K values that have been loaded before as single values—i.e., as soon K values from the first K-th part of the array are being read. These values are thus being loaded twice. For this reason, two loops are used during conversion. In the first loop, a scalar convert function is called on the single value being loaded in each iteration and a vectorized convert function is called on the K values loaded from the back of the array. The first loop ends as soon as the point where the next K values are already converted is reached. From here, the second loop starts that runs to the end of the array and only converts the remaining values in the front. Loading the other K values in the iteration happens without conversion. This way all values get converted only once during building the heap.

Performing the back-conversion on each data element only once is straight forward. In one embodiment, the write_back( ) function is only called each time K ordered values are written back to the sorted section within the sort_heap( ) function (see Table 5) and it is never called a second time on these K values. For this reason, this function is overwritten to enable the back-conversion while sorting the values.

TABLE 12

Pseudo code for the write_back ( ) function

```
static const __m128i INVERT_MASK = _mm_setr_epi32(-1, -1, -1, -1)
void write_back(__128i* ptr, __128i out) {
    out = _mm_xor_si 128(out, INVERT_MASK);
    _mm_store_si 128(ptr, out);
}
```

Table 12 illustrates an example of a write_back( ) function that is used to invert values while writing them back. The function uses bitwise-XOR SIMD instruction and a static INVERT_MASK to invert the values before storing them in memory. The INVERT_MASK is created during compile time Hiding of Conversion and SIMD Instructions The vectorized heapsort implementation will only be used in a large number of applications if it is completely hidden behind an interface similar to std::sort( ) of the standard template library or it replaces std::sort( ) directly. The following description discusses how the conversion function and the selection of the SIMD instructions for the given data type are hidden to obtain a developer friendly interface.

The conversion functions can be hidden via C++ templates. For example, the vectorized heapsort implementation gets a comparator Compare comp passed—similar as the std::sort function of the C++ standard template library. Together with the data type that is passed as template parameter, the comparator allows to select the correct load( ) and write_back( ) function that are internally used to convert the values before and after sorting as well as to select the appropriate horizontal aggregation SIMD instruction that is used within the sift_down( ) and sort_heap( ) function. A proxy function that has two nested switch statements is used.

The outer switch statement checks the order based on the passed comparator. If std::less is passed as comparator, horizontal maximum SIMD instructions are selected or, if such instructions are not available, then the load( ) function and write_back( ) function are used to sort values ascending. Similarly, if std::greater is passes as comparator, horizontal minimum SIMD instructions are selected or, if such instructions are not available, then the conversion functions used to sort values descending. For custom comparator functions (e.g., lambda functions), the regular sort implementation, i.e., std::sort( ), is used.

The inner switch statement selects the correct horizontal aggregation SIMD instructions for the given data type or selects an appropriate conversion function in case of limited instruction support. If the data type and sort order are directly supported by the CPU's SIMD instructions the algorithm is running on, then these instructions are selected and load( ) function and write_back( ) function that do no conversion at all are chosen. If the data type width is supported by a SIMD instruction of the CPU (e.g., integer 16-bit) but the signedness of the passed data type or sort order is not directly supported, then the appropriate conversion functions from Table 7 are chosen. If the data type width is not supported by the CPU, then the regular sort implementation, i.e., std::sort( ), is used.

The conversion function and the select horizontal aggregation SIMD instruction are passed as function template parameters to the sift_down( ) and sort heap( ) function. Therefore, there is no runtime overhead in these functions coming from selecting and passing the SIMD instruction and conversion functions in the proxy function. In an embodiment, the proxy function needs to be rewritten with each new CPU instruction set that has additional horizontal aggregation SIMD instructions in order to benefit of them.

Process Overview

Figure 2B:
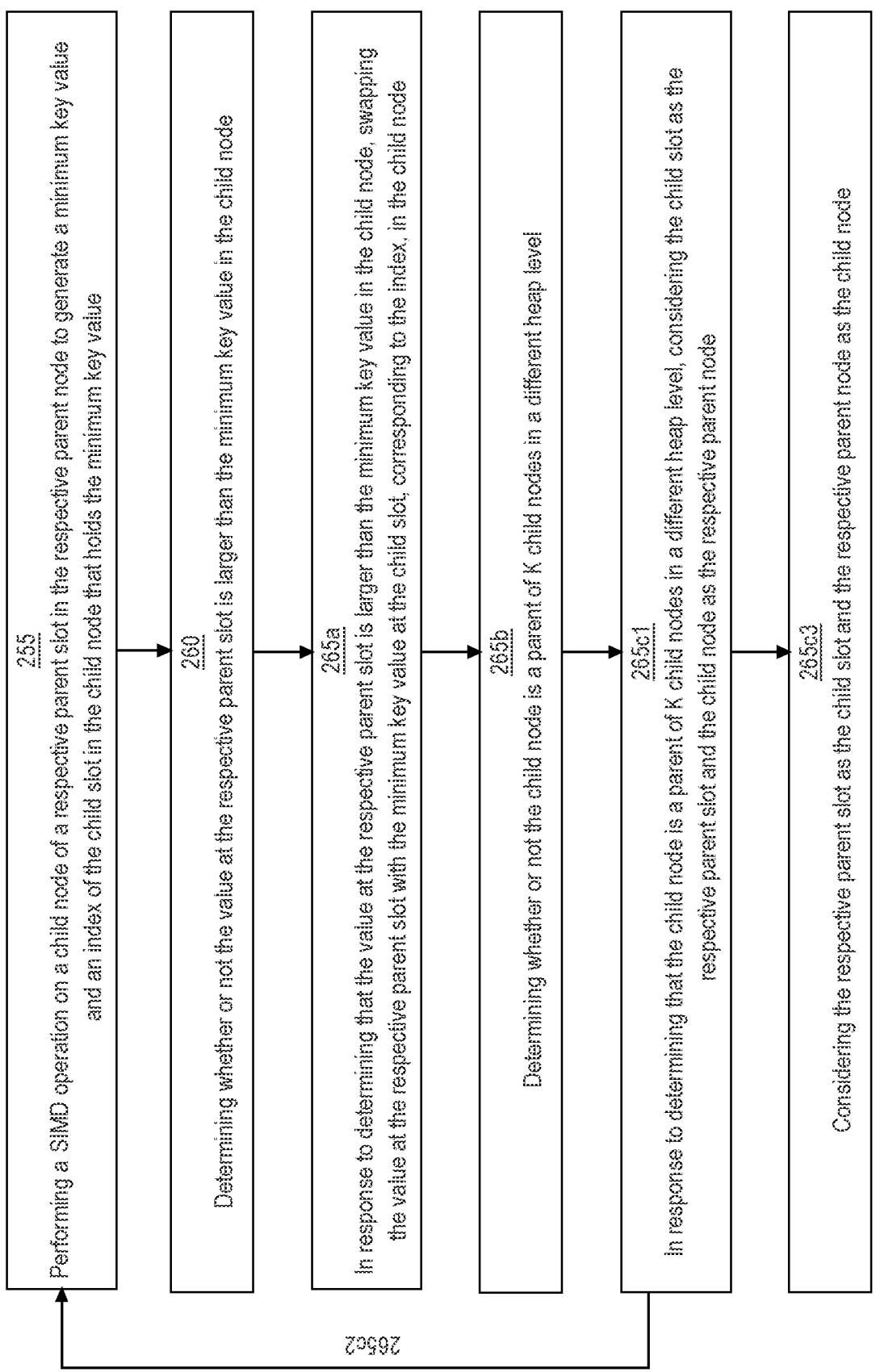

FIGS. 2A-2C illustrate a flow diagram that depicts a process 200 for using horizontal aggregation SIMD instructions to obtain vectorized Heapsort. The process 200 may be performed in any processor containing vector instruction sets. For example, the x86 processor architecture allows the instructions to operate on an independent register set including registers, which contain eight 16-bit values being compared. The process 200 sorts a plurality of key values in descending order. However, it will be appreciated that the method 500 can be performed to sort a plurality of keys in ascending order.

Referring to FIG. 2A, at step 205, a heap is populated with a plurality of key values. The plurality of key values is unsorted in a heap region. The heap includes a plurality of nodes. Each node of the plurality of nodes comprises K slots, K being a whole number greater than one, wherein the K slots of a respective node are stored contiguously within a memory address space of memory. The plurality of nodes includes a root node and a plurality of parent nodes, each parent node of the plurality of parent nodes having K child nodes, each child node of the K child nodes being a child of a parent slot in a respective parent node. In an embodiment, populating the heap includes trueing the root node such that valid heap properties are maintained. Trueing the root node entails verifying that the heap is a valid heap and modifying the heap if and as needed to render the heap valid. Trueing the root node may involve repeatedly swapping values in the root node with the smallest value in a descendant and recursively repeating this operation for that dependent resulting in every descendant of the root node being a valid heap. When sorting descending, a valid heap property is a max-heap property, where the value of each node or child is less than or equal to the value of its parent, with the maximum value at the root node. Compare to when sorting ascending, a valid heap property is a min-heap property, where the value of each node or child is greater than or equal to the value of its parent, with the minimum value at the root node. In an embodiment, trueing the root node comprises a top-down procedure. Alternatively, trueing the root node comprises a bottom-up procedure, as illustrated in FIG. 2B.

Referring to FIG. 2B, the bottom-up procedure comprises, starting with the last parent node and repeating for each preceding parent node in the heap region, and then starting with the last parent slot in a respective parent node and repeating for each preceding parent slot in the respective parent node, the following steps illustrated in FIG. 2B are performed.

At step 255, a SIMD operation is performed on a child node of a respective parent slot in the respective parent node to generate a minimum key value and an index of a child slot in the child node that holds the minimum key value.

At step 260, a determination is made as to whether or not the value at the respective parent slot is larger than the minimum key value in the child node.

In response to in response to determining that the value at the respective parent slot is larger than the minimum key value in the child node, the following substeps of step 265 are performed. At step 265*a*, the value at the respective parent slot is swapped with the minimum key value at the child slot, corresponding to the index, in the child node. At step 265*b*, a determination is made as to whether or not the child node is a parent of K child nodes in a different heap level. In response to determining that the child node is a parent of K child nodes in a different heap level, the following substeps of step 265*c* are performed. At step 265*c*1, the child slot is considered as the respective parent slot and the child node as the respective parent node. At step 265*c*2, steps from step 255 are repeated. At step 265*c*3, the respective parent slot is considered as the child slot and the respective parent node as the child node.

The bottom-up construction of FIG. 2B starts with the last (rightmost) parent node, fixes the heap rooted at it. In particular, if a parent slot does not satisfy the min-heap property, then the key value at the parent slot is exchanged with its smallest value in its child node until the heap condition holds. This is repeated for each parent slot and is then repeated for the preceding parent node. After this, valid heap properties are maintained.

Returning to FIG. 2A, steps 210-230 related to sorting the plurality of key values. Steps 210-230 are repeated for multiple iterations. In an embodiment, steps 210-230 are repeated until the size of the heap region is zero. At step 210, a SIMD operation is performed on the root node to generate a minimum key value and an index of a root slot in the root node that holds the first minimum key value.

At step 215, the minimum key value is added in a temporary array of size K.

At step 220, a last key value at the end of heap region is moved into the root slot associated with the first index, thereby decreasing the size of the heap region.

At step 225, a particular slot is trued such that valid heap properties are maintained, wherein the particular slot is the root slot. In an embodiment, trueing a particular slot, illustrated in FIG. 2C, is similar to trueing the root node described above. Trueing the particular slot entails verifying that the portion of the heap stemming from that slot conforms to valid heap properties and modifying the portion if and as needed to render the portion in conformance with valid heap properties. Trueing a particular slot may involve swapping the value in the particular slot with the smallest value in a descendant and recursively repeating this operation for that dependent resulting in every descendant of the particular slot being a valid heap. After the root slot is trued, valid heap properties for the root slot are maintained.

Referring to FIG. 2C, trueing the root slot starts at step 275, where a SIMID operation is performed on a child node of the root slot to generate a minimum key value and an index of a child slot in the child node that holds the minimum key value.

At step 280, a determination is made as to whether or not the value at the root slot is larger than the minimum key value in the child node.

In response to determining that the value at the root slot is larger than the minimum key value in the child node, the following substeps of step 285 are performed. At step 285a, the value at the root slot is swapped with the minimum key value at the child slot, corresponding to the index, in the child node. At step 285b, a determination is made as to whether or not the child node is a parent of child nodes in a different heap level. In response to determining that the child node is a parent of K child nodes in a different heap level, the following substeps of step 285c are performed. At step 285c1, the child slot is considered as the root slot. At step 285c2, steps from step 275 are repeated. At step 285c3, the root slot is considered as the child slot.

Returning to FIG. 2A, at step 230, when the temporary array satisfies one or more criteria, the temporary array is copied to a sorted region, thereby increasing the size of the sorted region by K, and all key values in the temporary array are removed. In an embodiment, one or more criteria include filling the temporary array with K values. In an embodiment, the key values in the temporary array are shuffled prior to copying the key values to the sorted region.

In an embodiment, the plurality of key values is stored in a heap array. In an embodiment, when the number of plurality of key values to be sorted is not a multiple of K, one or more special values are appended to the heap array such that the size of the heap array is a multiple of K prior to step 205. Depending on whether the sort is descending or ascending, the smallest or largest possible value of the data type being sorted, respectively, is appended at the end of the heap array. After sorting, the appended special values are ignored as the smallest values (e.g., special values) are moved to the end of the array when sorting descending, while the largest values (e.g., special values) are moved to the end of the array when sorting ascending.

Figure 2D:
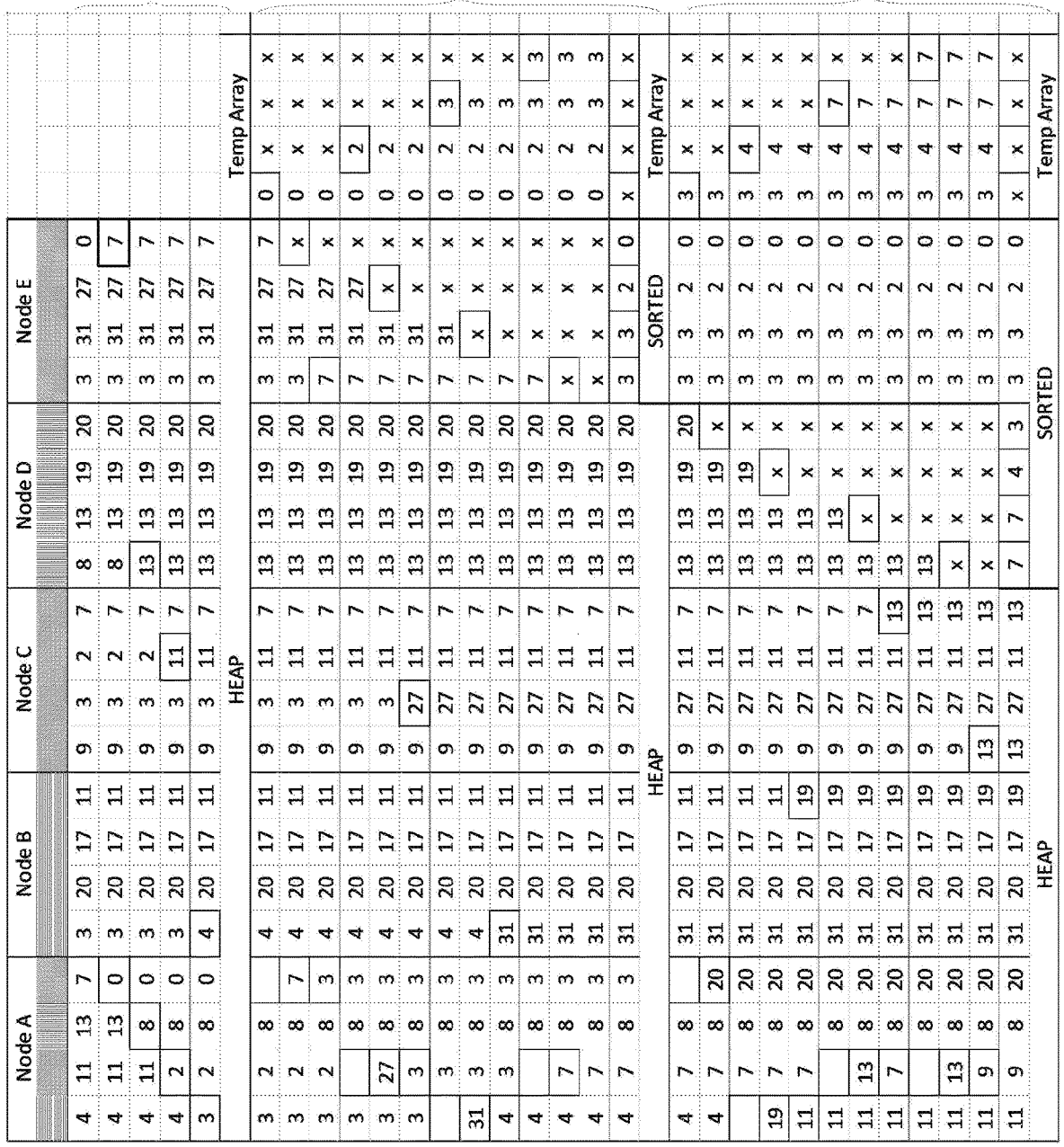
Figure 2E:
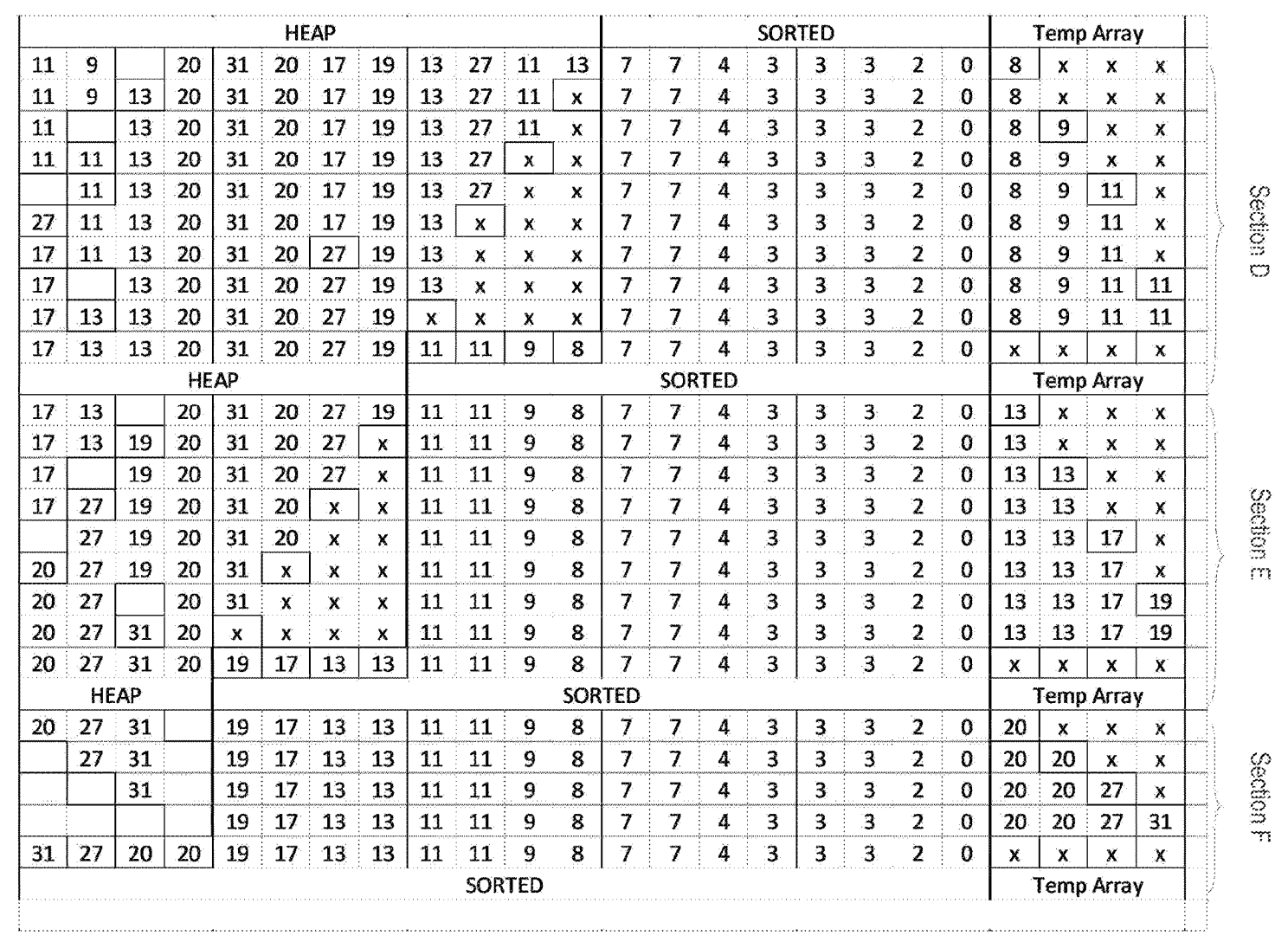

FIGS. 2D-2E illustrate an example 290 depicting sorting using vectorized Heapsort. In the example 290 of FIG. 2D, K=4 and a plurality of key values stored in a heap array to be sorted are 4, 11, 13, 7, 3, 20, 17, 11, 9, 3, 2, 7, 8, 13, 19, 20, 3, 31, 27, and 0. There are two heap levels in the example 200: one root node level and one non-root level. The root node level includes root node A. The non-root level includes child node B, child node C, child node D, and child node E. Each root slot and its corresponding child node are both indicated by the same indicator (e.g., horizontal lines, left diagonal lines, vertical lines, right diagonal lines). In particular, the child node of the last root slot (holding the value 7) of the root node is child node E. The child node of the preceding root slot (holding the value 13) of the root node is child node D. The child node of the preceding root slot (holding the value 11) of the root node is child node C. The child node of the preceding root slot (holding the value 4) of the root node is child node B.

The Section A relates to populating a heap with the plurality of keys, including trueing the root node A. The values in each node may be stored as a vector in a register. The phminposuw instruction may be used to find the value and position of the smallest vector value for a node, such as a child node. In the example 290, the value 0 in the parent node A and the value 7 in child node E are swapped; the value 8 in the parent node A and the value 13 in the child node D are swapped; the value 11 in the parent node A and the value 2 in the child node C are swapped; and, the value 4 in the parent node A and the value 3 in the child node B are swapped. After the root node A is trued (e.g., the value in each root slot in the root node is smaller than the values in its corresponding child node) such that valid heap properties are maintained, the order of the key values is now 3, 2, 8, 0, 4, 20, 17, 11, 9, 3, 11, 7, 13, 13, 19, 20, 3, 31, 27, and 7. These key values are unsorted in the heap region of size 20. The sorted region is size 0. The resulting heap is illustrated in FIG. 1A.

Sections B-F relate to five (5) iterations to sort the key values in the heap region. After each of the five (5) iterations, the size heap region decreases by K (e.g., 4) while the size of the sorted region increases by K (e.g., 4). At the end of all iterations, the size of the heap region is 0 as all the values are sorted in descending order in the sorted region of size 20.

A temporary array is used to store K (e.g., 4) smallest key values from the heap region in each iteration. After the temporary array has K (e.g., 4) values, these values are copied from the temporary array to the sorted region and the temporary array is then cleared of all values.

When the smallest key value and its index are found in the root node, the smallest key value is stored in the temporary array, and the last value in the heap section is copied to the root slot corresponding to the index, thereby decreasing the size of the heap section by one. The root slot is then trued (e.g., the value at the root slot is smaller than the values in its corresponding child node) such that valid heap properties are maintained.

After the first iteration, the unsorted key values in the heap region are 4, 7, 8, 3, 31, 20, 17, 11, 9, 27, 11, 7, 13, 13, 19, and 20. The sorted key values in the sorted region are 3, 3, 2, and 0.

After the second iteration, the unsorted key values in the heap region are 11, 9, 8, 20, 31, 20, 17, 19, 13, 27, 11, and 13. The sorted key values in the sorted region are 7, 7, 4, 3, 3, 3, 2, and 0.

After the third iteration, the unsorted key values in the heap region are 17, 13, 13, 20, 31, 20, 27, and 19. The sorted key values in the sorted region are 11, 11, 9, 8, 7, 7, 4, 3, 3, 3, 2, and 0.

After the fourth iteration, the unsorted key values in the heap region are 20, 27, 31, and 20. The sorted key values in the sorted region are 17, 17, 13, 13, 11, 11, 9, 8, 7, 7, 4, 3, 3, 3, 2, an d0.

After the fifth iteration, there are no more key values in the heap region as all the key values are in the sorted region. The key values in the sorted region are sorted in descending order: 31, 27, 20, 20, 19, 17, 13, 13, 11, 11, 9, 8, 7, 7, 4, 3, 3, 3, 2, and 0.

In the example 290, each row pertains to one or more steps being performed, and each value being swapped, moved, or otherwise acted upon in a corresponding row is boxed.

Benefits and Applications

Several experiments were conducted, showing that vectorized Heapsort that uses horizontal aggregation SIMD instructions is superior over regular Heapsort. In particular, the vectorized Heapsort employs horizontal aggregation SIMD instructions to advantageously minimize the number of comparisons needed to find the smallest values during sorting. Instead of one comparison at a time, K comparisons are done at one time. The following discusses the setup and outcome of these experiments.

The inventors conducted experiments on a system that comprises an Intel i7-4770 CPU with a core frequency of 3.40 GHz and 16 GB of main memory. The inventors used Linux (kernel version 4.4.0) as operating system. The algorithms are implemented in C++ and were compiled using GCC 5.4.0.

The inventors compared a regular scalar Heapsort implementation and the vectorized Heapsort implementation of the present invention. For the vectorized Heapsort implementation, K=8. Before each experiment, the inventors generated uniform random values and stored them within an array.

Figure 3:
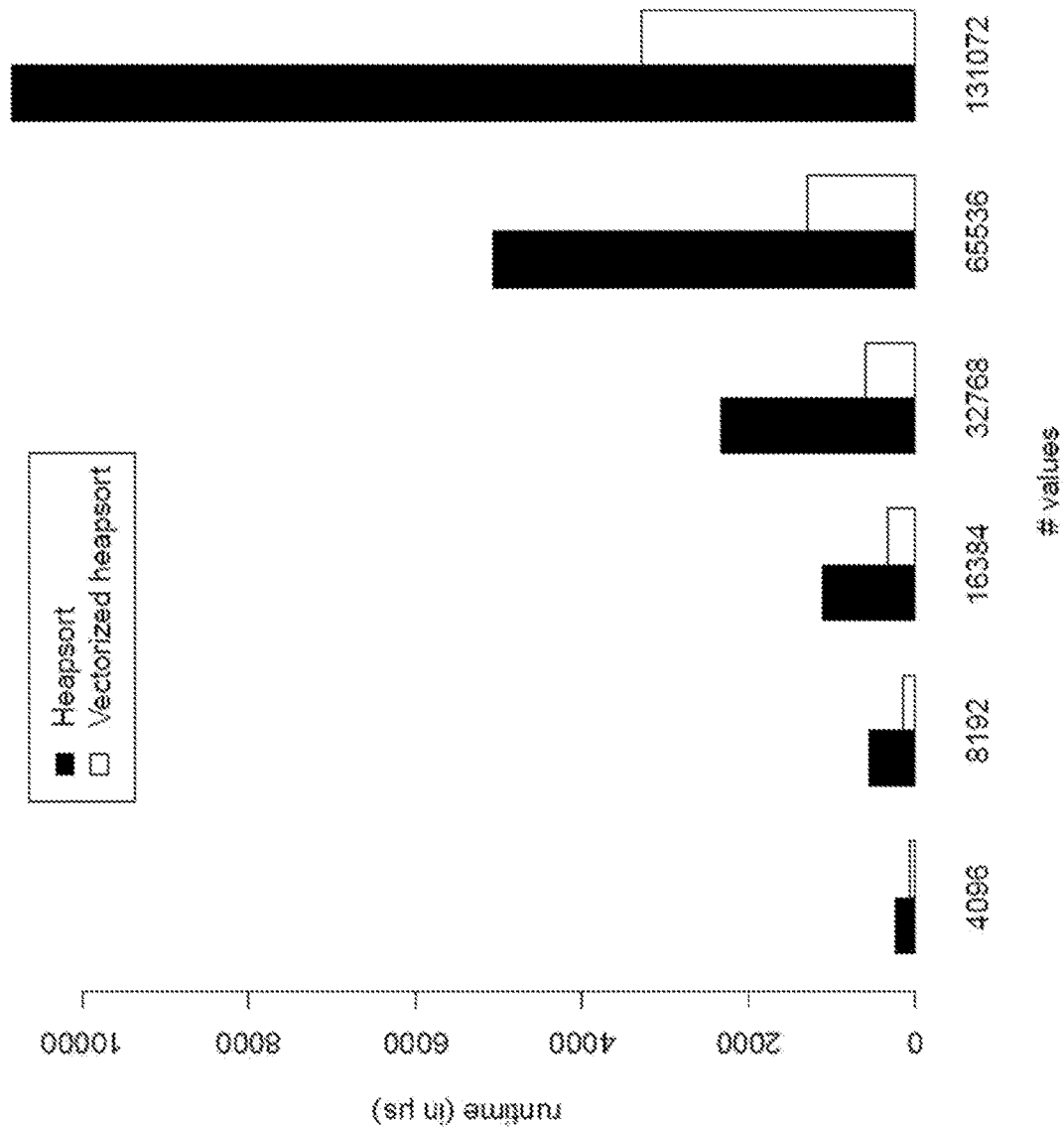
FIG. 3 illustrates a graph depicting performance comparison of Heapsort and vectorized Heapsort for varying array sizes.

FIG. 3 illustrates a graph depicting performance comparison of Heapsort and vectorized Heapsort for varying array sizes. As can be seen, vectorized Heapsort is for any array size considerably faster than regular Heapsort. It is in average about 3× faster than Heapsort. For some array sizes, e.g., 32K and 64K, vectorized Heapsort is even up to 4× faster than Heapsort. The inventors saw similar performance results for smaller arrays as well as larger arrays.

The vectorized Heapsort can be implemented in a vast number of applications/products. Sorting is a fundamental operation and is used to some degree in almost all applications and systems. Especially, algorithms where sorting is responsible for a large fraction of an algorithm's overall runtime (certain queries and index creation in databases, various data mining algorithms, search index creation in information retrieval) would significantly benefit if the sort algorithm is exchanged with the vectorized heapsort implementation. Hence, all companies (e.g., Facebook, Microsoft, SAP, IBM, Google, Amazon) that process large amounts of data might integrate the vectorized Heapsort in their products and applications.

The vectorized Heapsort can further be integrated into data structures and functions provided by various language libraries (e.g., std::sort of the C++ standard template library, sort in Java). All programs using these data structures of these libraries would then automatically benefit of the vectorized Heapsort. Similarly, the vectorized Heapsort could be integrated as a rule in just-in-time compilers, which then could detect and rewrite sort implementations during the runtime of a program. Even if the performance improvements are limited in programs that do not use sorting heavily, the cumulated performance improvements of the vast number of programs that benefit of the method is substantially.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
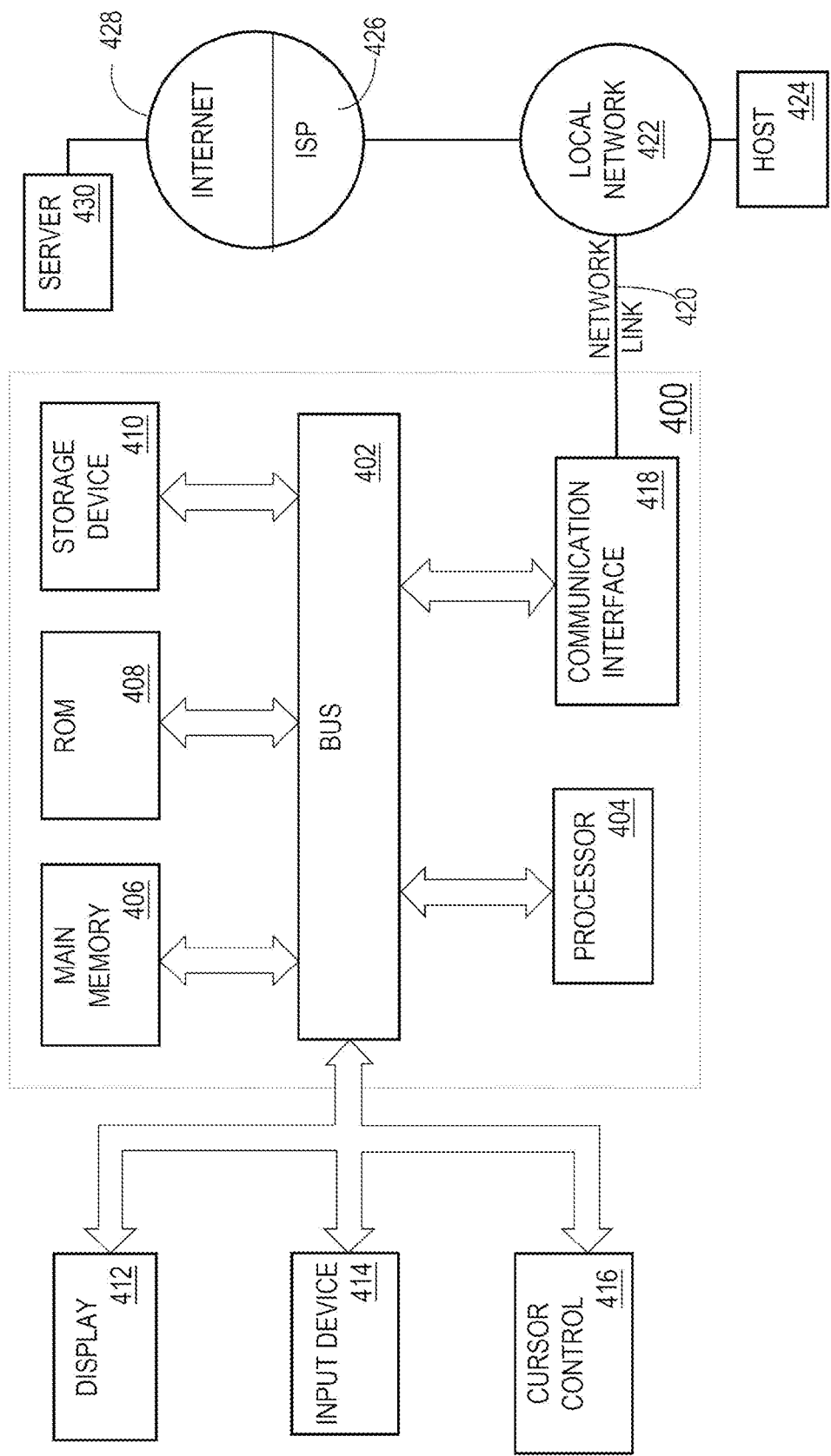
FIG. 4 illustrates a diagram depicting a computer system that may be used in an embodiment of the present invention.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
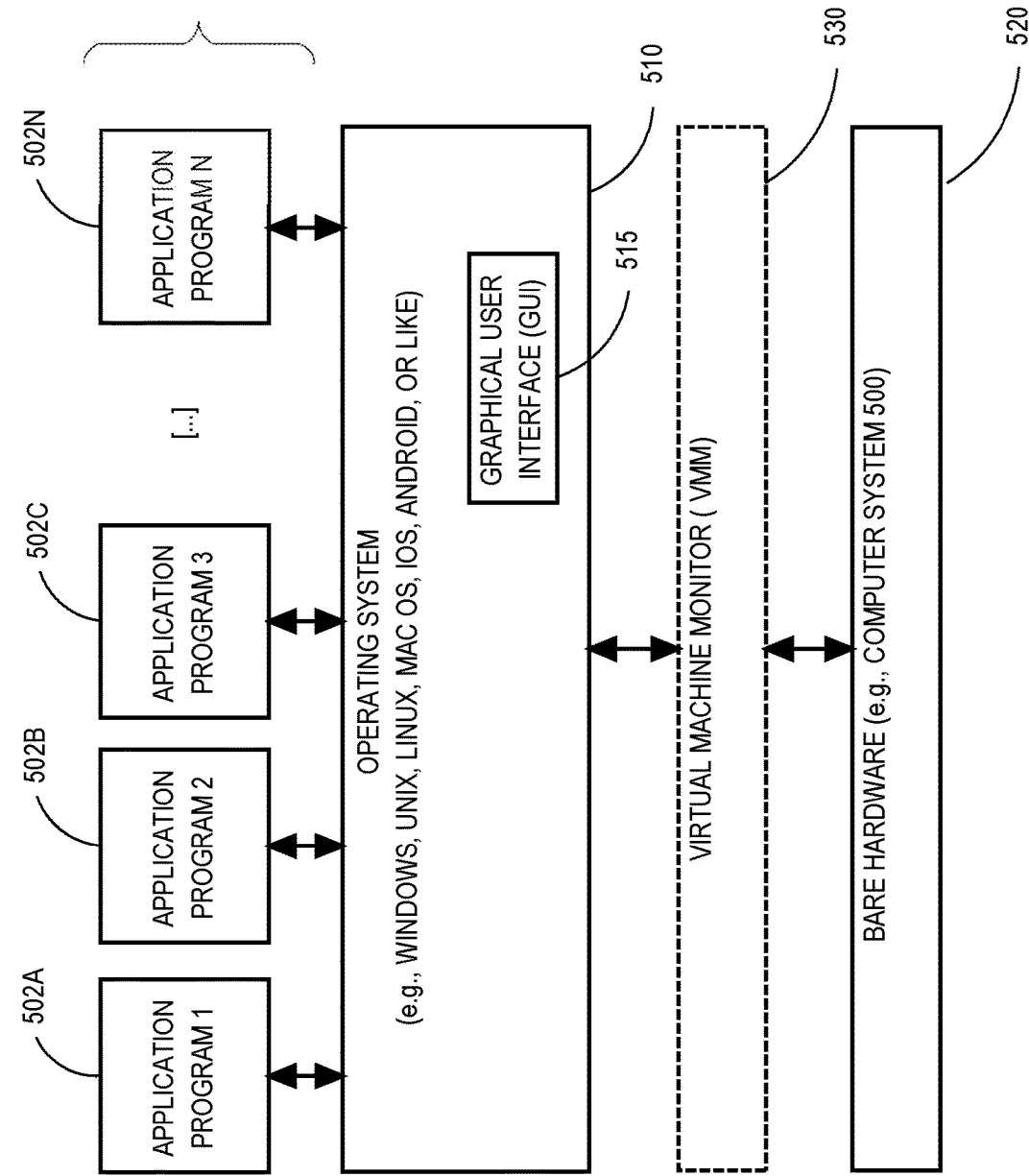
FIG. 5 illustrates a diagram depicting a software system upon which an embodiment of the invention may be implemented.

FIG. 5 is a block diagram of a software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 400. The applications or other software intended for use on system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of system 500. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method comprising:
  populating a heap with a plurality of key values, wherein the plurality of key values are in a heap region within an original region of memory,
  wherein the heap comprises a plurality of nodes,
  wherein each node of the plurality of nodes comprises K slots, K being a whole number greater than one, wherein the K slots of a respective node are stored contiguously within a memory address space of memory,
  wherein the plurality of nodes includes a root node and a plurality of parent nodes, each parent node of the plurality of parent nodes having K child nodes, each child node of the K child nodes being a child of a parent slot in a respective parent node;
  wherein populating a heap with a plurality of key values includes trueing the root node such that valid heap properties are maintained;
  for multiple iterations:
    performing a SIMD operation, the SIMD operation occurring on the root node to generate a minimum key value and an index of a root slot in the root node that holds the minimum key value;
    adding the minimum key value in a temporary array of size K after the minimum key value is generated, wherein all key values in the temporary array are added from the root node;
    moving a last key value at the end of the heap region into the root slot associated with the index, thereby decreasing the size of the heap region;
    trueing the root slot such that valid heap properties are maintained;
    when the temporary array satisfies one or more criteria, copying the temporary array to a sorted region of the original region of memory formerly occupied by the heap region, thereby increasing the size of the sorted region and storing all keys in the sorted region in increasing or decreasing order;
    removing all key values in the temporary array.

2. The method of claim 1, wherein each pointer of a set of pointers points to a memory space storing a respective node of said plurality of nodes, and wherein prior to performing the SIMD operation on the root node, a respective pointer of the set of pointers points to the root node to load the root node into a register used by the SIMD operation on the root node.

3. The method of claim 1, wherein trueing the root node comprises using a bottom-up procedure.

4. The method of claim 3, wherein the bottom-up procedure comprises:
  starting with a last parent node and repeating for each preceding parent node in the heap region,
    starting with a last parent slot in a respective parent node and repeating for each preceding parent slot in the respective parent node, steps comprising:
      performing a SIMD operation on a child node of a respective parent slot in the respective parent node to generate a minimum key value in the child node and an index of a child slot in the child node that holds the minimum key value in the child node;
      determining whether or not a value at the respective parent slot is larger than the minimum key value in the child node;
      in response to determining that the value at the respective parent slot is larger than the minimum key value in the child node,
        swapping the value at the respective parent slot with the minimum key value at the child slot, corresponding to the index, in the child node;
      determining whether or not the child node is a parent of K child nodes in a different heap level;
      in response to determining that the child node is a parent of K child nodes in a different heap level, considering the child slot as the respective parent slot and the child node as the respective parent node;
      repeating the steps from performing a SIMD operation;
      considering the respective parent slot as the child slot and the respective parent node as the child node.

5. The method of claim 1, wherein trueing the root slot comprises:
  performing a SIMD operation on a child node of the root slot to generate a minimum key value in the child node and an index of a child slot in the child node that holds the minimum key value in the child node;
  determining whether or not a value at the root slot is larger than the minimum key value in the child node;
  in response to determining that the value at the root slot is larger than the minimum key value in the child node, swapping the value at the root slot with the minimum key value at the child slot, corresponding to the index, in the child node.

6. The method of claim 1, wherein the plurality of key values is stored in a heap array.

7. The method of claim 6, when a number of the plurality of key values is not a multiple of K, appending one or more special values to the heap array such that a size of the heap array is a multiple of K.

8. The method of claim 7, further comprising removing the one or more special values after the plurality of key values are sorted.

9. The method of claim 1, wherein the one or more criteria is filling the temporary array with K values.

10. The method of claim 1, wherein copying the temporary array to a sorted region comprises shuffling the key values in the temporary array.

11. One or more non-transitory storage media storing sequences of instructions which, when executed by one or more processors, cause:
  populating a heap with a plurality of key values, wherein the plurality of key values are in a heap region within an original region of memory,
  wherein the heap comprises a plurality of nodes,
  wherein each node of the plurality of nodes comprises K slots, K being a whole number greater than one, wherein the K slots of a respective node are stored contiguously within a memory address space of memory, wherein the plurality of nodes includes a root node and a plurality of parent nodes, each parent node of the plurality of parent nodes having K child nodes, each child node of the K child nodes being a child of a parent slot in a respective parent node;

wherein populating a heap with a plurality of key values includes trueing the root node such that valid heap properties are maintained;

for multiple iterations:
performing a SIMD operation, the SIMD operation occurring on the root node to generate a minimum key value and an index of a root slot in the root node that holds the minimum key value;
adding the minimum key value in a temporary array of size K after the minimum key value is generated, wherein all key values in the temporary array are added from the root node;
moving a last key value at the end of the heap region into the root slot associated with the index, thereby decreasing the size of the heap region;
trueing the root slot such that valid heap properties are maintained;
when the temporary array satisfies one or more criteria,
copying the temporary array to a sorted region of the original region of memory formerly occupied by the heap region, thereby increasing the size of the sorted region and storing all keys in the sorted region in increasing or decreasing order;
removing all key values in the temporary array.

12. The one or more non-transitory storage media of claim 11, wherein each pointer of a set of pointers points to a memory space storing a respective node of said plurality of nodes, and wherein prior to performing the SIMD operation on the root node, a respective pointer of the set of pointers points to the root node to load the root node into a register used by the SIMD operation on the root node.

13. The one or more non-transitory storage media of claim 11, wherein trueing the root node comprises using a bottom-up procedure.

14. The one or more non-transitory storage media of claim 13, wherein the bottom-up procedure comprises:
starting with a last parent node and repeating for each preceding parent node in the heap region,
starting with a last parent slot in a respective parent node and repeating for each preceding parent slot in the respective parent node, steps comprising:
performing a SIMD operation on a child node of a respective parent slot in the respective parent node to generate a minimum key value in the child node and an index of a child slot in the child node that holds the minimum key value in the child node;
determining whether or not a value at the respective parent slot is larger than the minimum key value in the child node;
in response to determining that the value at the respective parent slot is larger than the minimum key value in the child node,
swapping the value at the respective parent slot with the minimum key value at the child slot, corresponding to the index, in the child node;
determining whether or not the child node is a parent of K child nodes in a different heap level;
in response to determining that the child node is a parent of K child nodes in a different heap level, considering the child slot as the respective parent slot and the child node as the respective parent node;
repeating the steps from performing a SIMD operation;
considering the respective parent slot as the child slot and the respective parent node as the child node.

15. The one or more non-transitory storage media of claim 11, wherein trueing the root slot comprises:
performing a SIMD operation on a child node of the root slot to generate a minimum key value in the child node and an index of a child slot in the child node that holds the minimum key value in the child node;
determining whether or not a value at the root slot is larger than the minimum key value in the child node;
in response to determining that the value at the root slot is larger than the minimum key value in the child node, swapping the value at the root slot with the minimum key value at the child slot, corresponding to the index, in the child node.

16. The one or more non-transitory storage media of claim 11, wherein the plurality of key values is stored in a heap array.

17. The one or more non-transitory storage media of claim 16, when a number of the plurality of key values is not a multiple of K, appending one or more special values to the heap array such that a size of the heap array is a multiple of K.

18. The one or more non-transitory storage media of claim 17, wherein the sequences of instructions include instructions that, when executed by one or more processors, further cause: removing the one or more special values after the plurality of key values are sorted.

19. The one or more non-transitory storage media of claim 11, wherein the one or more criteria is filling the temporary array with K values.

20. The one or more non-transitory storage media of claim 11, wherein copying the temporary array to a sorted region comprises shuffling the key values in the temporary array.

* * * * *

UNITED STATES PATENT AND TRADEMARK OFFICE
CERTIFICATE OF CORRECTION

PATENT NO. : 11,016,778 B2
APPLICATION NO. : 16/299483
DATED : May 25, 2021
INVENTOR(S) : Schlegel et al.

It is certified that error appears in the above-identified patent and that said Letters Patent is hereby corrected as shown below:

On the Title Page

On page 2, Column 1, item (56) under Other Publications, Line 26, delete "datged" and insert -- dated --, therefor.

On page 2, Column 2, item (56) under Other Publications, Line 2, delete "AddisonWesley" and insert -- Addison-Wesley --, therefor.

On page 2, Column 2, item (56) under Other Publications, Line 14, delete "Yorkm" and insert -- York --, therefor.

On page 2, Column 2, item (56) under Other Publications, Line 39, delete "AddisonWesley" and insert -- Addison-Wesley --, therefor.

In the Specification

In Column 1, Line 19, delete "structures" and insert -- structures. --, therefor.

In Column 1, Line 49, delete "section" and insert -- section. --, therefor.

In Column 5, under TABLE 1, Line 1, delete "sort ( )" and insert -- sort( ) --, therefor.

In Column 5, under TABLE 2, Line 5, delete "si 128((" and insert -- si128(( --, therefor.

In Column 5, under TABLE 2, Line 6, delete "epu 16(in);" and insert -- epu16(in); --, therefor.

In Column 5, under TABLE 2, Line 7, delete "epi 16(res," and insert -- epi16(res, --, therefor.

In Column 5, under TABLE 2, Line 8, delete "extract epi 16(res," and insert -- extract_epi16(res, --, therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,016,778 B2

In Column 7, under TABLE 5, Line 8, delete "si 128((" and insert -- si128(( --, therefor.

In Column 7, under TABLE 5, Line 9, delete "epu 16(in);" and insert -- epu16(in); --, therefor.

In Column 8, under TABLE 6, Line 2, delete "ptr,128i" and insert -- ptr, __128i --, therefor.

In Column 8, under TABLE 6, Line 3, delete "si 128" and insert -- si128 --, therefor.

In Column 10, under TABLE 12, Line 1, delete "back ( )" and insert -- back( ) --, therefor.

In Column 10, under TABLE 12, Line 2, delete "-1)" and insert -- -1); --, therefor.

In Column 10, under TABLE 12, Line 4, delete "si 128" and insert -- si128 --, therefor.

In Column 10, under TABLE 12, Line 5, delete "si 128" and insert -- si128 --, therefor.

In Column 10, Line 45, delete "time" and insert -- time. --, therefor.

In Column 13, Line 9, delete "SIMID" and insert -- SIMD --, therefor.